United States Patent
Begeja et al.

(10) Patent No.: US 6,546,009 B1
(45) Date of Patent: Apr. 8, 2003

(54) METHOD OF REDUCING DELAYS IN PACKET DATA TRANSMISSION

(75) Inventors: Lee Begeja, Gillette, NJ (US); Andrew J. Berkley, Summit, NJ (US); David Arthur Berkley, Summit, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/131,959

(22) Filed: Aug. 11, 1998

(51) Int. Cl.⁷ .............................. H04L 12/28; H04J 3/24
(52) U.S. Cl. ..................... 370/389; 370/474; 379/88.01
(58) Field of Search ................................. 370/355, 356, 370/352, 389, 400, 401, 435, 465, 468, 470, 471, 493, 474, 230, 235, 252, 255, 508, 392, 473, 476; 379/93.08, 88.01, 202, 88.17

(56) References Cited

U.S. PATENT DOCUMENTS

| | | | |
|---|---|---|---|
| 5,051,983 A | * 9/1991 | Kammerl | 370/60 |
| 5,148,429 A | * 9/1992 | Kudo et al. | 379/9.42 |
| 5,606,561 A | 2/1997 | Scheibel, Jr. et al. | |
| 5,703,902 A | * 12/1997 | Ziv et al. | 375/200 |
| 6,049,537 A | * 4/2000 | Proctor et al. | 370/342 |
| 6,064,653 A | * 5/2000 | Farris | 370/237 |
| 6,115,357 A | * 9/2000 | Packer et al. | 370/231 |
| 6,014,385 A | * 11/2000 | Ayanoglu et al. | 370/458 |

* cited by examiner

Primary Examiner—Huy D. Vu
Assistant Examiner—Duc Ho

(57) ABSTRACT

A method of reducing transmission delays in a packet-switched telephone system. Each of the data packets carrying telephone voice data is under-filled when necessary in order to avoid undue delays in sending the packets to their designation. Under-filling of the packets allows a routine telephone conversation to take place with out being adversely affected by network delays or delays normally attributed to the time needed to accumulate sufficient data to fill a packet to its normal size. Packets may also be filled to their normal size by combining data from more than one telephone call if the data from the other calls is immediately available. Filling an otherwise under-filled packet with data from multiple telephone calls avoids the inefficiencies which would otherwise be present with under-filled packets for a single call.

17 Claims, 3 Drawing Sheets

METHOD OF REDUCING DELAYS IN PACKET DATA TRANSMISSION

BACKGROUND OF THE INVENTION

The present invention relates generally to the field of telecommunications and related systems. More particularly, the invention is directed to a method of more effectively conducting telephone communications over a computer network, such as the Internet.

In modern network communications, data is typically sent from one point to another using established protocols and standards. These protocols and standards allow equipment from various manufacturers and of various designs to exchange data without the need for special interfaces or conversion processes and the like.

A well established way of sending data over a computer network is to partition the data into small packets having a regular format. Each packet, also known in the art as a datagram, includes an electronic address which is used to route the packet across the network to its designation. The packets are then reassembled at the destination and the data restored to its original or some other prearranged format.

Data communications over the Internet, for example, are conducted in accordance with the Internet Protocol (IP) suite. The IP suite provides for the transmission of packets from source to destination through the various interconnected networks which form the Internet. While the IP suite does not guarantee delivery of each packet, the integrity of the data carried by the packet, or the order in which the packets arrive at the destination, it does provide error protection for some of the critical information within the packet.

FIG. 1 illustrates the format of an IP packet. The packet includes a header portion 1, which carries control information about the packet, and data portion 2, which contains the data being carried by the packet. Header portion 1 typically has a fixed format and length while data portion 2 may vary in length.

FIG. 2 is a more detailed illustration of the format of an IP packet with header portion 1 and data portion 2. As shown in FIG. 2, Byte 0 of header 1 includes a 4-bit Version field which indicates the format of the Internet header and a 4-bit Internet Header Length (IHL) field which indicates the length of the Internet header in 32-bit words.

Byte 1 is an 8-bit Type Of Service Field which indicates the type of service which is to be given to the packet.

Bytes 4 and 5 form a 16-bit Total Length field which indicates the total length of the packet (including header and data) measured in octets.

Bytes 6 and 7 form a 16-bit Identification fields which contains a value assigned by the sending device to aid in assembling the packets.

Byte 8 includes a 3-bit Flags field which contains flags controlling fragmentation of the packet and a 13 bit Fragment Offset field which indicates where in the packet this fragment belongs.

Byte 9 is an 8-bit Time To Live field which places a limit on the life span of the packet.

Byte 10 is an 8-bit Protocol field which indicates the protocol associated with the data in the data portion of the packet.

Bytes 11 and 12 form a 16-bit Header Checksum field which represents a checksum computed on the packet header field only.

Bytes 13–16 contain a 32-bit IP address which specifies the Source Address of the packet.

Bytes 17–20 contain a 32-bit IP address which specifies the Destination Address of the packet.

Bytes 21–22 form a variable length Option field.

Byte 23 is a Padding field.

The source and destination IP addresses contained in the packet header are divided into two fields, a network-identifier and a host-identifier. The network-identifier specifies a particular physical network in the Internet and the host-identifier specifies a particular device attached to the specified physical network.

In order to reach its destination, an IP packet may have to traverse a variety of different physical networks. While an IP packet is in a given physical network, it is transported in the same manner that the physical network transports any kind of data. For example, one common kind of physical network is a local area network (LAN) which uses the Ethernet® protocol. In the Ethernet protocol, data moves in packets called "frames". Each frame has a preamble; a destination Ethernet address; a source Ethernet address; an ethertype field, which specifies a type of the protocol; a data field, which carries the data; and a frame check sequence, which is an error checking code. When an Ethernet frame is carrying an IP packet, such as illustrated in FIG. 1, the packet simply occupies the data field of the frame.

Implementations of telephony systems over computer networks, such as the Internet, are now starting to emerge. One of the problems associated with present implementations, however, are the inherent delays associated with filling a packet with telephony data. These delays degrade the quality of the voice communication to the point that, in many cases, it is not acceptable to the consumer.

Prior art attempts to reduce delay focused on optimizing the packing of packets to provide the maximum total bandwidth for data transmission. See for example, U.S. Pat. No. 5,606,561. Such methods stream data well but do not provide for the delays associated with the conversational nature of a telephone call.

Accordingly, there is a great need in the art for an improved method of conducting telephony communications across a network.

SUMMARY OF THE INVENTION

Accordingly, it is an objective of the present invention to obviate the above-noted shortcomings and disadvantages of present methods of conducting telephony communications across a network.

It is a further objective of the present invention to provide an improved method of conducting telephony communications across a network without imposing inconvenience to the user.

It is a still further objective of the present invention to provide an improved method of conducting telephony communications across a network which is economical to implement and simple in operation.

It is a further objective of the present invention to provide an improved method of conducting telephony communications across a network which is more economical than prior art approaches.

It is a still further objective of the present invention to provide an improved method of conducting telephony communications across a network which can be readily implemented in an existing system.

BRIEF DESCRIPTION OF THE DRAWINGS

The novel features of the present invention are set out with particularity in the appended claims, but the invention will be understood more fully and clearly from the following detailed description of the invention as set forth in the accompanying drawings in which:

BRIEF DESCRIPTION OF THE PREFERRED EMBODIMENT

A preferred embodiment of the present invention will now be described with reference to the accompanying drawing.

Figure 3:
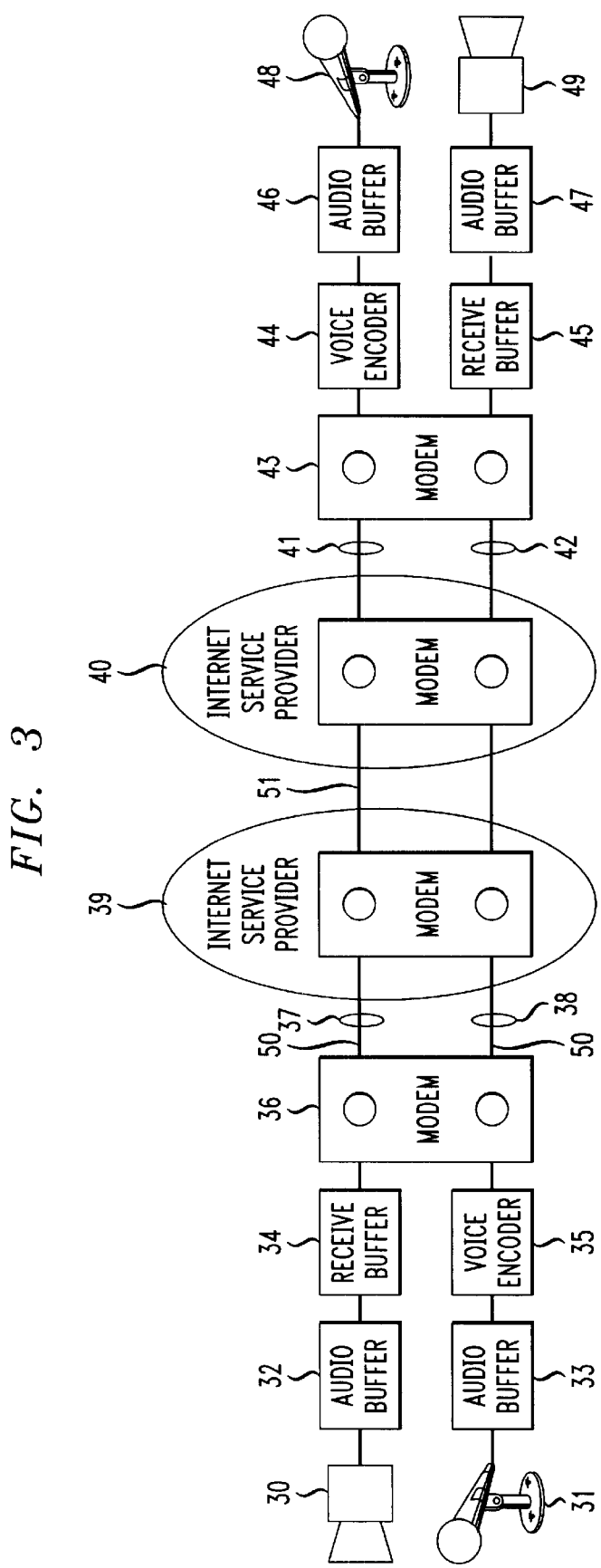
FIG. 3 is a block diagram of a telephone communications system in accordance with the present invention.

FIG. 3 is a block diagram of a packet-switched telephony communication system. The system includes a speaker 30 and microphone 31 at one location and a corresponding speaker 49 and microphone 48 at another location. Thus, two users of the system may communicate with each other using the provided microphones and speakers.

Coupled to speakers 30 and 49 are respective audio buffers 32 and 47. Attached to the audio buffers are respective receive buffers 34 and 45. The receive buffers are connected to respective modems 36 and 43. Coupled to microphones 31 and 48 are respective audio buffers 33 and 46. Attached to audio buffers 33 and 46 are voice encoders 35 and 44. Encoders 35 and 44 convert the analog sound signals received from microphones 31 and 48 to digital signals which can be transmitted over a network.

Audio buffers 32,47 and 33,46 store the digital version of analog speech signals that either come from microphones 31,48 or go to speakers 30,49. The size of these buffers and the packetized buffer directly influence delay.

As is known in the prior art, a buffer is filled with data so that the information channel will be used optimally with respect to the amount of data carried, with the more data being carried the better and more efficient use of the channel. In accordance with the present invention, the buffers are filled with the minimum amount required to maintain the flow of the telephone conversation and thus minimize the amount of delay.

The present invention also reduces the need for receive buffers 34,45. These buffers help to maintain a flow of speech across, for example, the Internet. On a typical Internet connection, neither the exact time of arrival nor the order of arrival of each packet is known. Buffers 34,45 compensate for this uncertainty. The present invention reduces the importance of buffers 34,45 since there is less information in any individual packet. Thus, it is not as important if some packets arrive late or out of order as algorithms known in the prior art can interpolate missing speech packets.

With the present invention, it is possible to reduce or eliminate receive buffers 34,45 and maintain a high quality connection since known algorithms for speech interpolation work better if there are smaller segments that need to be interpolated.

With reference again to FIG. 3, a pair of modems 36 and 43 are provided which speakers 30 and 49 and microphones 31 and 48 used to communicate with respective Internet Service Providers (ISP) 39 and 40 over telephones lines 50. ISPs 39 and 40 communicate with each other via packet-switched network 51 which forms the Internet.

The encoded voice data which originates from microphones 31 and 48 is sent to speakers 49 and 30 in the data portions of IP packets as described above. Ideally, the most efficient way to send the data is to make the data portion of each packet very large. Accordingly, fewer packets are required to carry the data and thus less processing is needed to reassemble the data upon receipt. The desire to fill each packet to a predetermined amount of data often introduces delays while the required data is being accumulated as noted above. In many situations, such delays do not cause problems. However, in an environment where the data must be delivered to its destination in a continuous and regular manner, a delay in creating data packets cannot be tolerated.

A delay in creating data packets is particularly troublesome when the packets carry voice data in a telephony system. Accordingly, the present invention avoids this problem by under-filling packets when necessary and using a variable bit rate coding algorithm at the beginning of an utterance so that a continuous and regular stream of data packets can be transmitted.

As pointed out above, one of the major problems of using a packet-based network for transmitting telephone conversations is the delay introduced by packet filling and transmission (routing, etc.). This delay is noticeable during interruption of speech by another party and is a major factor in quality of service for telephone calls. For example, a packet may hold a quarter of a second of coded speech. If one side of a conversation has been speaking for a few seconds and then the other party starts to interrupt, there is a delay of one-half second plus transmission delay before the reaction of the first party to the interruption is heard by a second party. This delay cannot be totally removed, but by providing for under-filled packets the delay can be significantly reduced. An under-filled packet is one in which the amount of speech encoded within it is less than the maximum possible.

Under-filling of packets can be achieved by measuring the elapsed time waiting for the packet to be filled. When the elapsed time exceeds a predetermine amount, further waiting is terminated and the under-filled packet is complete.

In order to overcome the efficiency lost to under-filling, packets from multiple conversations can be combined. As a result, the overall delay can be reduced to near that of a standard telephone call. Additionally, only under-filled packets at the start of a speech burst could be used and then fully-filled packets later.

Figure 4:
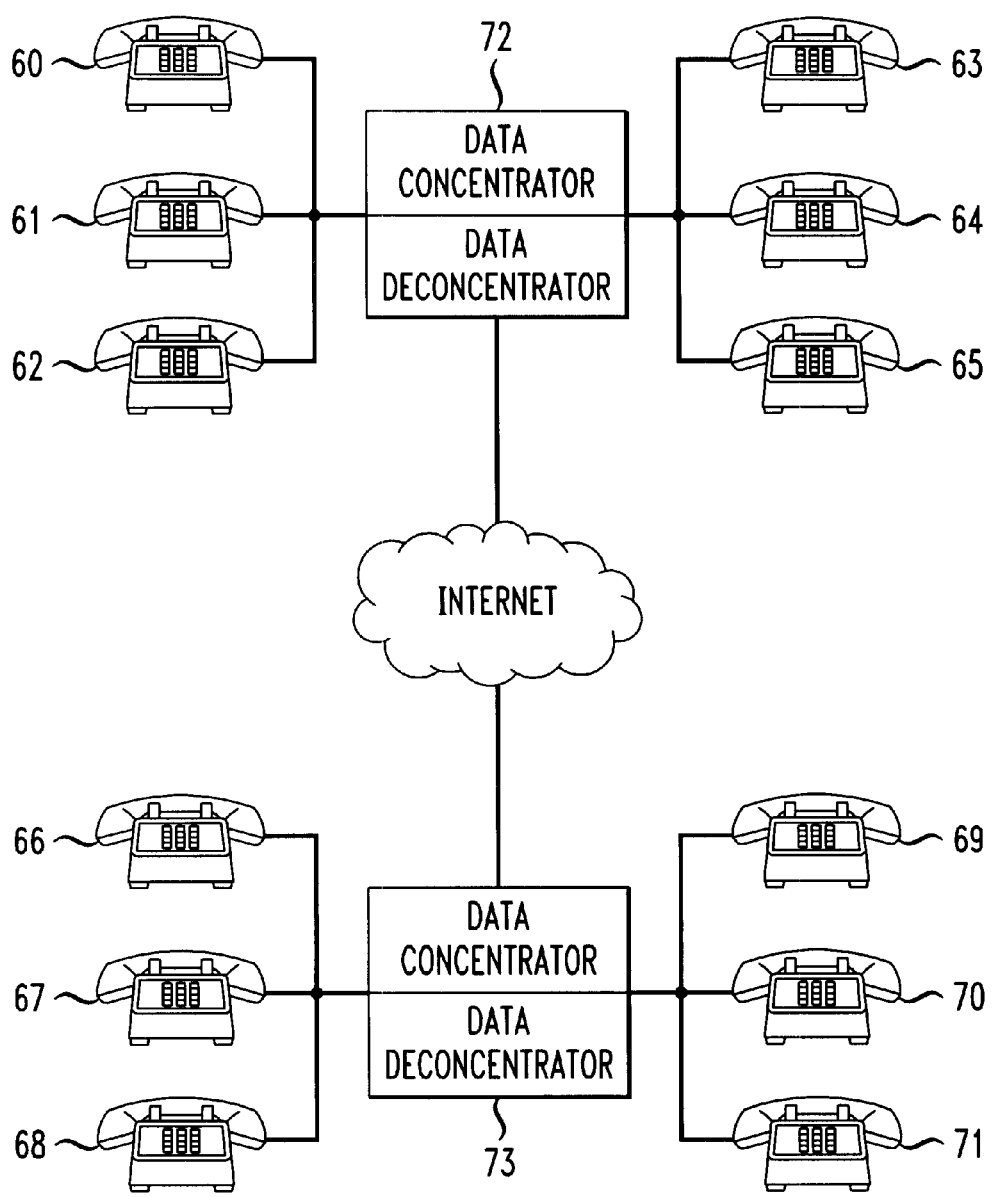
FIG. 4 is a further block diagram of a telephone communications system in accordance with the present invention.

FIG. 4 illustrates how the method of filling IP packets in a packet-switched telephony system may be implemented where multiple conversations are combined. FIG. 4 shows a plurality of telephones 60–65 in a particular area, for example, New York. The telephones are coupled to a data concentrator/deconcentrator 72. Another plurality of telephones 66–71 located in, for example, Los Angeles, are connected to a second data concentrator/deconcentrator 73.

Assume that several of the New York telephones are in communication with telephones in Los Angeles over the Internet as described above with respect to FIG. 3. The function of data concentrator/deconcentrator 72 and 73 is to supervise how the data portion of each packet is filled and to maintain a continuous and regular flow of the packets between each device. For example, if there is not sufficient data from telephone 60 to fill a packet within a predetermined time, data concentrator/deconcentrator 72 will use data from another active telephone conversation to make up the difference. When the packet arrives at data concentrator/deconcentrator 73, the packet data is deconcentrated and buffered as necessary before being sent to the destination telephone.

Figure 1:
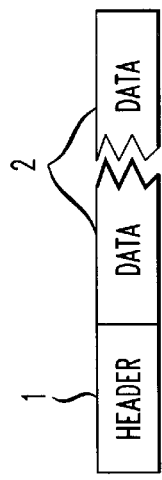
FIG. 1 is a block diagram illustrating the basic format of an Internet Protocol packet.
Figure 2:
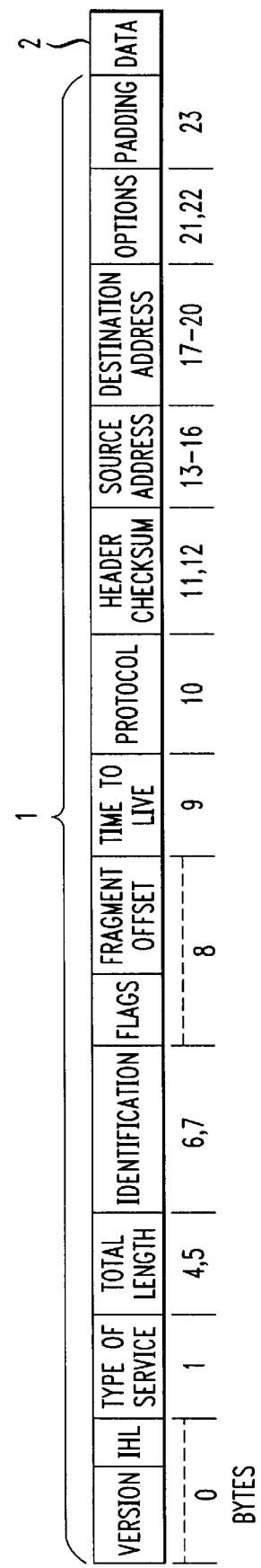
FIG. 2 is a more detailed block diagram illustrating the format of an Internet Protocol packet.

Information concerning the data being carried by the packet may be encoded, for example, in the above-described. Identification field of the packet illustrated in FIG. 2.

Applicants have also found that in addition to large size packets, lower bit rate packet coders contribute to delay. The delay can be minimized by using a higher bit rate coding method at the start of a speech burst. In particular, it would be advantageous to also use a smaller packet size as discussed above. An advantage is gained both from the faster packet filling and the smaller packet size. As described above with respect to under-filling packets, transition to a lower bit rate and longer packets could be made after the initial packets are launched.

It should be obvious from the above-discussed apparatus embodiment that numerous other variations and modifications of the apparatus of this invention are possible, and such will readily occur to those skilled in the art. Accordingly, the scope of this invention is not to be limited to the embodiment disclosed, but is to include any such embodiments as may be encompassed within the scope of the claims appended hereto.

We claim:

1. A method of reducing transmission delays in a data transmission system, wherein said data is transmitted through said system in packets, each of said packets having a data portion of a predetermined size and an address portion, said method comprising the steps of:
   defining a predetermined time required to fill said data portion of a packet;
   filling said data portion of said packet, over time, with data;
   measuring an elapsed portion of said predetermined time waiting for said packet to be filled; and
   transmitting said packet when the elapsed portion equals said predetermined time regardless of whether said packet is completely filled or under-filled.

2. The method of claim 1 further including the step of filling said address portion with a destination address for said packet.

3. The method of claim 2 further including the step of sending said packet over said transmission system for delivery to said destination address.

4. The method of claim 1 further including the steps of:
   including within said address portion of said packet a plurality of destination addresses;
   including within said data portion of said packet data for delivery to respective ones of said plurality of destination addresses; and
   sending said packet over said transmission system for delivery of said data to said respective ones of said plurality of destination addresses.

5. A method of reducing transmission delays in a telephone system, wherein telephone voice data is transmitted over said system in packets, each of said packets having a data portion of a predetermined size and an address portion, said method comprising the steps of:
   defining a predetermined time required to fill said data portion of a packet;
   filling said data portion of said packet, over time, with telephone voice data;
   measuring an elapsed portion of said predetermined time waiting for said packet to be filled with said telephone voice data; and
   transmitting said packet when the elapsed portion equals said predetermined time regardless of whether said packet is completely filled or under-filled.

6. The method of claim 5, further including the step of filling said address portion with a destination address for said packet.

7. The method of claim 6 further including the step of sending said packet over said telephone system for delivery to said destination address.

8. The method of claim 5 further including the steps of:
   including, within said address portion of said packet, a plurality of destination addresses;
   including, within said data portion of said packet, telephone voice data for delivery to respective ones of said plurality of destination addresses; and
   sending said packet over said telephone system for delivery of said telephone voice data to said respective ones of said plurality of destination addresses.

9. The method of claim 8 further including the step of: associating each of said destination addresses with a telephone number.

10. The method of claim 5 further including the steps of:
    forming said telephone voice data in accordance with voice utterances; and
    using a variable bit rate code to encode said telephone voice data.

11. The method of claim 10 further including the steps of:
    dividing said voice utterances into portions of time; and
    using a first bit rate of said variable bit rate code to encode said telephone voice data during selected ones of said portions of time and using a second bit rate of said variable bit rate code to encode said telephone voice data during others of said portions of time.

12. The method of claim 10 further including the steps of:
    dividing said voice utterances into portions of time; and
    using a first bit rate of said variable bit rate code to encode said telephone voice data during selected ones of said portions of time and using a second bit rate of said variable bit rate code having a lower bit rate to encode said telephone voice data during others of said portions of time.

13. The method of claim 12 further including the steps of:
    using said first bit rate code to encode said telephone voice data during said portions of time associated with the beginning of said voice utterances; and
    using said second bit rate code to encode said telephone voice data during others of said portions of time.

14. A method of reducing transmission delays in a telephone system, wherein telephone voice data is transmitted over said system in packets, each of said packets having a data portion of a predetermined size and an address portion, said method comprising the steps of:
    forming said telephone voice data in accordance with voice utterances;
    using a variable bit rate code to encode said telephone voice data at the beginning of each utterance;
    defining a predetermined time required to fill said data portion of a packet;
    filling a data portion of said packet, over time, with said encoded telephone voice data;
    measuring an elapsed portion of the predetermined time waiting for said packet to be filled with said encoded telephone voice data; and
    transmitting said packet when the elapsed portion equals said predetermined time regardless of whether said packet is completely filled or under-filled.

15. The method of claim 14 further including the steps of:

dividing said voice utterances into portions of time; and using a first bit rate of said variable bit rate code to encode said telephone voice data during selected ones of said portions of time and using a second bit rate of said variable bit rate code to encode said telephone voice data during others of said portions of time.

16. The method of claim 14 further including the steps of:

dividing said voice utterances into portions of time; and using a first bit rate of said variable bit rate code to encode said telephone voice data during selected ones of said portions of time and using a second bit rate of said variable bit rate code having a lower bit rate to encode said telephone voice data during others of said portions of time.

17. The method of claim 16 further including the steps of:

using said first bit rate code to encode said telephone voice data during said portions of time associated with the beginning of said voice utterances; and using said second bit rate code to encode said telephone voice data during others of said portions of time.

* * * * *